United States Patent Office 3,188,301
Patented June 8, 1965

3,188,301
RESIN AND PROCESS FOR ITS PREPARATION
Lyman R. Roberts and Cyril B. Coenen, Concord, Calif., assignors to Shell Oil Company, New York, N.Y., a corporation of Delaware
No Drawing. Filed Apr. 17, 1962, Ser. No. 188,253
2 Claims. (Cl. 260—57)

This invention relates to the production of improved resins. More particularly, it relates to the production of improved resins from certain aromatic petroleum fractions and resins derived therefrom by reaction with certain epoxy compounds.

Resins have been produced by a number of processes in which aromatic hydrocarbon fractions were condensed with aldehydes such as formaldehyde. Technical difficulties have been encountered, however, in the production of such resins in two major respects: first, most of the resins produced are originally dark in color and require further treatment to remove the color bodies or color fractions. The reason for this is apparently two-fold, namely, the source of the aromatic fractions so treated (containing chromophoric precursors) and the resinification conditions. Further, the production of resins has required extended reaction times with the several catalyst and solvent environments explored. This results in increased product costs and in reduced throughput for a plant of a given size. Moreover, the resins so obtained are substantially inactive with respect to condensation with polyepoxy compounds. If a resin could be obtained from a by-product stream of a petroleum refinery, which was light colored and at the same time was produced from a reaction of a relatively short duration, the resin would be extremely low cost and therefore competitive with a number of other products (both natural and synthetic) now utilized for many diversed purposes.

An object of the present invention is to provide a process for the production of improved resins. It is another object of the invention to provide improved resins derived from certain aromatic hydrocarbon fractions. It is a further particular object of the invention to provide a light colored resin by a process requiring relatively short reaction times. Another object of the invention is to provide a resin which is condensable with polyepoxy compounds. Other objects will become apparent during the following description of the invention.

Now, in accordance with this invention, a novel resin product is obtained comprising the total condensation product of formaldehyde, a phenol, and a certain aromatic hydrocarbon feed, said feed boiling within the limits from about 450° F. to about 715° F., the feed being substantially free of olefin hydrocarbons and of alpha alkyl naphthalenes and containing at least about 70% by weight of beta-alkyl naphthalenes (including beta,beta'-dialkyl naphthalenes). The resins so produced have an average molecular weight between about 450 and 650, a ring and ball softening point of 200–270° F. and an ASTM color in 20% benzene solution of between about 3 and about 7.

Still in accordance with this invention, a process is provided whereby light colored resins having the above properties are produced which comprises reacting formaldehyde, a monohydric phenol and the described aromatic hydrocarbon feed in the presence of a $C_{1-4}$ fatty acid and zinc chloride, the reaction being carried on for a period of time between about 0.5 and 2.5 hours at the reflux temperature of the fatty acid.

In further accordance with this invention, it has been found that this resinous product is condensable with certain epoxy compounds to form epoxidized resins in the presence of epoxy curing agents, apparently due to the presence of the phenolic portion of the resin. This is contrasted to the lack of condensation occurring between the epoxy compounds and resins produced from formaldehyde and the aromatic hydrocarbon fraction in the absence of a phenol.

In its preferred form, the resin so described is derived from the aromatic hydrocarbon feed boiling within the limits from about 460 and 700° F., containing at least about 70% by weight of beta alkyl naphthalenes and/or $\beta,\beta'$-dialkyl naphthalenes, and 5–25% by weight of partially hydrogenated bicyclic hydrocarbons in the presence of acetic acid, phenol, formaldehyde and zinc chloride. The preferred process embodies the use of the above components which are heated together for a time between about 0.75 and about 2 hours at the reflux temperature of acetic acid (about 115° C.).

Still in accordance with the preferred aspect of the invention, it is preferred that the resin have an average molecular weight of between about 475 and 600, a softening point of 200–270° F. and a ASTM color in 20% benzene solution of between about 3 and 7. The above preferred resin is produced by the use of the acid medium (1.0–7.5 volumes of acid per volume of aromatic feed) and zinc chloride catalyst (1–12% based on the acetic acid), while the proportions of phenol and formaldehyde are preferably restricted to amounts between about 15 and about 30% each by weight based on the hydrocarbon feed.

One of the essential aspects of the invention comprises the discovery of an economic source of feed hydrocarbons which have been found to have precisely the components so highly desired in a resin and which enable the production of a light colored resin while utilizing the short reaction times recited hereinbefore. Of course, it is possible to obtain the desired feed by artificially assembling a desired beta-alkyl naphthalenes and diluting them, if desired, with partially hydrogenated bicyclic hydrocarbons. However, from an economic standpoint, it is much more efficient to utilize hydrocarbons meeting these requirements as long as undesirable components are virtually absent from such a source. Consequently, in accordance with one aspect of the present invention, it has been found that the bottoms fraction from a catalytic reforming operation on a hydrocarbon stream constitutes a highly desirable source of such hydrocarbons.

In reforming operations, the objective is normally to convert naphthenes to aromatics. Certain side reactions also occur, but it has been found that the bottoms obtained from the re-distillation of platformed or other reformed products constitutes the optimum source of aromatic hydrocarbon feeds for use in the present invention. This is due to the fact that reformate bottoms boiling within the recited boiling range, particularly platformate bottoms, containing substantially no olefinic components and less than about 10% by weight of alkyl benzenes, the bottoms being composed substantially entirely of at least about 70% of beta-alkyl naphthalenes (including beta,-beta'-dialkyl naphthalenes) and 5–25% by weight of partially hydrogenated bicyclic hydrocarbons, usually referred to as tetralins and indanes.

In the course of making the present invention, numerous hydrocarbon streams from petroleum refineries were examined to determine their constitution. However, when resins were made from such streams with formaldehyde using various catalyst and solvent systems, it was found that they were all unsatisfactory in one way or another. For example, many aromatics extracts from refineries are obtained in the preparation of lubricating oils. However, such extracts contain not only a certain amount of heterocyclic compounds but also alpha-alkyl naphthalenes and other polynuclear aromatics in addition to the desired beta-alkyl naphthalenes. The investigation leading to the present invention demonstrated that alpha-alkyl naphthalenes are undesirable for the present purpose since they form relatively dark colored and insoluble resins with formaldehyde as contrasted to the light colored soluble resins obtained from condensation of formaldehyde and beta-alkyl naphthalenes.

Further search for suitable streams disclosed that aromatic petroleum fractions from distillates such as those obtained by treating virgin naphthas from aromatic based petroleums with a liquid $SO_2$ contained lower boiling aromatics indicating the preponderance therein of alkyl benzenes. Condensation of such fractions with formaldehyde resulted in light, amber-colored resins but only after extended reaction times. Moreover, in many cases the resins so obtained were relatively low in melting point and, if shorter reaction times were employed, then non-solid resins were obtained. Consequently, the most preferred and economic source of suitable hydrocarbon feeds for use in the present invention comprises the bottoms product obtained in the distillation of reformate, commonly referred to as reformate bottoms, said bottoms having a preferred boiling range between about 450° and about 715° F. at atmospheric pressure. Such streams usually contain at least about 70% by weight of beta-alkyl naphthalenes, substantially no olefins and substantially no alpha-alkyl naphthalenes. The principal components other than beta alkyl naphthalenes are tetralins and indanes, both of these being regarded as "partially hydrogenated bicyclic hydrocarbons."

Numerous catalytic systems were investigated in the course of making the present invention. These included the use of well-known condensation catalysts such as sulfuric acid, aluminum chloride and ferric chloride. A number of reaction solvents were studied including formic acid in addition to fatty acids having from 1 to 4 carbon atoms per molecule (the latter including formic, acetic, propionic, butanoic and mixtures thereof). In investigating the catalyst systems referred to above, it was found that most of them were too active to result in the preparation of light colored resins which are so highly desired. In many cases, in fact, it was found that resins were produced which were tarry in color (being blackish brown), and at the same time were undesirable with respect to their solubility characteristics.

Active catalysts such as sulfuric acid or aluminum chloride normally formed dark, relatively infusible and insoluble resins having little utility for the contemplated purposes even when the preferred source of hydrocarbon aromatic feed was utilized therewith. Investigation further showed that the only catalyst system found to be satisfactory both with respect to product solubility and product color was zinc chloride and that the only suitable reaction medium was one or more fatty acids having from 1 to 4 carbon atoms per molecule.

Under these complex requirements, the present invention is restricted both with respect to the aromatic hydrocarbon feed, with respect to the catalyst employed and with respect to the acid solvents utilized as the reaction medium.

When combined within the proportions described hereinbefore, it has been possible to produce resins having an average molecular weight between about 450 and 650, a ring and ball softening point between about 200 and about 280° F., and an ASTM color between about 3 and 7 in 20% benzene solution while employing relativeingly short reaction times (0.5–2.5 hours) at the reflux temperature of the fatty acid reaction medium. Thus, the resin, constituting the total condensation product of formaldehyde, a phenol and the specified aromatic hydrocarbon feed, constitutes a novel resin sharply differentiated from those produced by prior art processes.

In the prior art, it was found necessary to fractionate the feed to remove chromophoric precursors and/or the product in order to remove insoluble and/or dark colored fractions in order to obtain light colored fraction; or it was found essential to utilize prolonged reaction times, in order to obtain light colored resins from alkyl benzenes. The latter, being essentially mono-functional with respect to formaldehyde, required these long times in order to result in sufficient resinification to obtain usable resins.

Phenols which are to be condensed with the above aromatic petroleum fraction and formaldehyde comprise phenol itself or alkyl phenols such as those having from 1 to 20 carbon atoms in the alkyl radicals. Representative starting compounds of this type are the various cresols, o-, m- and p-ethyl phenol, p-propyl phenol, p-isopropyl phenol, p-tertiarybutyl phenol, 2,4-di-methyl phenol, 2-methyl-4-tertiarybutyl phenol, 2 - tertiarybutyl-4-methyl phenol, 2-methyl-4-dodecyl phenol, 2,4-ditertiarybutyl phenol, 2,6-diethyl phenol, 2-methyl-6-tertiarybutyl phenol, 2,4,6-trimethyl phenol, 2,6-diethyl-4-methyl phenol, 2,4,6- triethyl phenol, 2,6-dipropyl-4-methyl phenol, 2,4,6-tripropyl phenol, 2,6-diethyl-4-tertiarybutyl phenol, 2-tertiarybutyl-4,6-dimethyl phenol, 2,4,6-tritertiaryamyl phenol, 2-tertiarybutyl-4,6-ditertiaryamyl phenol, 2-tertiaryamyl-4,6-dimethyl phenol, 2-isopropyl-5,6-dimethyl phenol, 4-methyl-2,6-ditertiaryamyl phenol and 2,6-ditertiarybutyl-4-tertiaryamyl phenol.

The phenols should be employed in preparing the resins of this invention in an amount between about 5 and 40% by weight based on the aromatic hydrocarbon feed. Preferably, between about 17.5 and 27.5% by weight of a phenol or mixture thereof is utilized.

The resins obtained by condensation of the above reactants are those which normally are obtainable by heating the aromatic hydrocarbon feed, phenol and formaldehyde in the presence of lower fatty acid and zinc chloride or a period of time of 0.5–2.5 hours usually at about the reflux temperature of the fatty acid. The resins so obtained are not only surprisingly light in color, have good resin properties but also have been found to be condensable with certain epoxy compounds to be described hereinafter for the production of epoxidized resins.

Especially satisfactory hydrocarbon feeds are typified by the following:

TABLE

*Aromatic hydrocarbon feeds*

| Sample | 1 | 2 | 3 | 4 | 5 | 6 | 7 | 8 |
|---|---|---|---|---|---|---|---|---|
| Re-Run Tops, R-3 Octane No. | 103.9 | 100.3 | 103.5 | 102.8 | 102.3 | 100.8 | 100.8 | 100.1 |
| Yield, percent w. on total reformate | 0.89 | 1.01 | 1.00 | 1.00 | 0.97 | 0.98 | 0.99 | 0.97 |
| Gravity, °API | 8.8 | 10.2 | 9.5 | 9.3 | 9.7 | 10.7 | 10.9 | 11.3 |
| ASTM Distillation, °F.: | | | | | | | | |
| IBP | 486 | 452 | 474 | 472 | 470 | 462 | 460 | 454 |
| EP | 700 | 656 | 684 | 684 | 678 | 652 | 636 | 644 |
| 10% | 498 | 488 | 486 | 486 | 480 | 470 | 470 | 468 |
| 50% | 508 | 502 | 500 | 500 | 496 | 586 | 586 | 488 |
| 90% | 576 | 548 | 546 | 552 | 544 | 536 | 532 | 520 |
| Flash Point, °F., PMcc | 250 | 230 | 240 | 235 | 240 | 235 | 230 | 225 |
| Color, ASTM D-1500 | L6.5 | L5.0 | L5.0 | L5.5 | L5.0 | L4.0 | L3.5 | L3.5 |
| Aromatics Distribution, percent v.: | | | | | | | | |
| Anthracenes and phenanthrenes | 0.2 | 0.1 | 0.2 | 0.2 | 0.2 | | | |
| Diphenyls | 2.6 | 1.9 | 2.2 | 2.3 | 2.0 | 0.8 | 1.3 | 1.2 |
| Naphthalenes | 87.5 | 79.9 | 81.7 | 81.7 | 79.3 | 71.8 | 70.9 | 67.0 |
| Tetralins and Indanes | 9.7 | 15.1 | 13.2 | 13.0 | 14.8 | 20.9 | 20.9 | 22.9 |
| Alkyl Benzenes | | 3.0 | 2.7 | 2.8 | 3.7 | 6.5 | 6.9 | 8.9 |

While the resins obtained as described above are useful in many applications such as compounding with rubbers, in paper sizing, in paint, lacquers or molding compositions, one of their special properties relates to the further resinification of the material with certain epoxy compounds, especially if this is in conjunction with an epoxy curing agent. The epoxidized resins have been found to have further suitable properties and constitute an exceptionally low cost epoxy resin for use in many places more costly epoxy resins are not used because of their higher cost.

The epoxidation of the resins described above is carried out in a simple manner by heating the resins described herein before with certain polyepoxides in the presence of an epoxy curing agent.

The polyepoxides to be used in preparing the compositions of the invention comprise those materials possessing more than one vicinal epoxy group, i.e., more than one

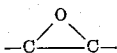

group. These compounds may be saturated or unsaturated, aliphatic, cycloaliphatic, aromatic, or heterocyclic and may be substituted with substituents such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to the examples of polyepoxides is incorporated by reference into this specification.

Other examples include the epoxidized esters of the polyethylenically unsaturated monocarboxylic acids, such as epoxidized linseed, soybean, perilla, oiticica, tung, walnut, and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such, as for example, di(2,3-epoxybutyl)-adipate, di(2,3-epoxybutyl)oxalate, di(2,3-epoxyhexyl)-succinate, di(3,4-epoxybutyl)maleate, di(2,3-epoxyoctyl)-pimelate, di(2,3-epoxybutyl)phthalate, di(2,3 - epoxyoctyl)tetrahydrophthalate, di(4,5-epoxydodecyl)maleate, di(2,3-epoxybutyl)terephthalate, di(2,3-epoxypentyl)thiodipropionate, di(5,6-epoxytetradecyl)diphenyl-dicarboxylate, di(3,4-epoxyheptyl)sulfonyldibutyrate, tri(2,3-epoxybutyl)-1,2,4-butanetricarboxylate, di(5,6-epoxypentadecyl)tartarate, di(4,5-epoxytetradecyl)maleate, di(2,3-epoxybutyl)azelate, di(3,4-epoxybutyl) citrate, di(5,6-epoxyoctyl)cyclohexane-1,3-dicarboxylate, di(4,5-epoxyoctadecyl)malonate.

Another group of the epoxy-containing materials include epoxidized esters of unsaturated alcohols and unsaturated carboxylic acids, such as 2,3-epoxybutyl 3,4-epoxypentanoate, 3,4-epoxyhexyl, 3,4 - epoxypentanoate, 3,4-epoxycyclohexyl, 3,4-epoxycyclohexylmethyl epoxycyclohexane carboxylate.

Still another group of the epoxy-containing materials include epoxidized derivatives of polyethylenically unsaturated polycarboxylic dibutyl 7,8,11,12-diepoxyoctadecanedioate, diocytl 10,11-diethyl-8,9,12,13 - diepoxy - eicosanedioate, dihexyl 6,7,10,11 - diepoxyhexadenanedioate, didecyl 9-epoxy-ethyl - 10,11 - epoxyoctadecenedioate, dibutyl 9-epoxy-ethyl-10,11-epoxyoctadecenedioate, dibutyl 3-butyl-3,4,5,6-diepoxycyclohexane-1,2 - dicarboxylate, dicyclohexyl 3,4,5,6-diepoxycyclohexane-1,2-dicarboxylate, dibenzyl 1,2,4,5-diepoxycyclohexane - 1,2 - dicarboxylate and diethyl 5,6,10,11-diepoxyoctadecyl succinate.

Still another group comprise the expodized polyesters obtained by reacting an unsaturated polyhydric alcohol and/or unsaturated polycarboxylic acid or anhydride groups such as for example, the polyester obtained by reacting 8,9,12,13-eiscosanedienedioic acid and ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,3-bis(2-cyclohexenyl)propane, epoxidized vinyl cyclohexane and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.), polyglycidyl ether of 1,1,5,5-tetrakis (hydroxyphenyl)pentane (epoxy value 0.514 eq./100 g.) and the like and mixtures thereof.

The compositions of the invention may be cured to form the desired product by application of heat. Temperatures used in such cure generally range from about 100° C. to about 250° C. This heat may be applied by the addition of the above components in a preheated condition, by adding of heated mineral aggregate to the mixture of components or by spreading of heated inert particles or aggregate on the compositions after being spread. The heat may also be applied externally by means of electrical or other types of heaters, infrared lamps, etc.

A great variety of substances are known to be hardening agents for the resin-forming ingredients of the composition such as alkalies like sodium or potassium hydroxide; alkali phenoxides like sodium phenoxides; carboxylic acids or anhydrides such as oxalic acid or phthalic anhydride; Friedel-Crafts metal halides like aluminum chloride, zinc chloride, ferric chloride, or boron trifluoride, as well as complexes thereof with ethers, acid anhydrides, ketones, diazonium salts, etc.; phosphoric acid and particle esters thereof including n-butyl ortho-phosphate, diethyl orthophosphate and hexaethyl tetraphosphate; and amino compounds such as triethylamine, ethylene diamine, diethylamine, diethylene triamine, triethylene tetramine, pyridine, piperidine, N,N'-diethyl-1,3-propane-diamine, dicyandiamide, melamine, fatty acid salts of amines, and the like. The curing agent is added and mixed in with the composition after its preparation as noted above. The amounts vary considerably depending upon the particular agent employed. For the alkalies or phenoxides, 1% to 4% is generally suitable. With phosphoric acid and esters thereof, good results are obtained with 1 to 10% added. The amino compounds are preferably used in amounts of about 5 to 15% and the others involve addition of about 1 to 45%.

The preferred type of curing agent (hardening agent) is as described in U.S. 2,938,004 and comprises reaction products of a monoepoxide having a terminal epoxy bridge group and containing no more than 12 carbon atoms and at least 1 aromatic polyamine having at least 2 primary amine groups, and having no group reacting with 1,2- epoxy groups other than the amine groups, at least 2.2 but not more than 10 moles of polyamine being reacted with 1 mol of the epoxide. More specifically, the glycidyl polyethers of dihydric phenols are most particularly preferred. Specifically, the condensation product of 2 moles, 2,2-bis(4-hydroxy phenyl)propane and epichlorohydrin condensed with para,para'-diamino diphenyl methane is particularly active in the present systems. The epoxidized resins are suitable for making plastic castings, for the coating of films and filaments and for use in lacquers, varnishes, and paints.

The following examples illustrate the production of the phenolic resins and the epoxidation of this product to form an epoxidized resin. Platformer bottoms, an aromatic hydrocarbon feed, was utilized which had the following properties.

TABLE

*Properties of feed*

| | |
|---|---|
| Gravity, °API | 10.7 |
| Molecular weight | 156 |
| Color, ASTM | L4.0 |

ASTM distillation, °F.:

| | |
|---|---|
| IBP | 460 |
| EP | 660 |
| 10% | 468 |
| 50% | 486 |
| 90% | 520 |

Hydrocarbon type, percent w.:

| | |
|---|---|
| Naphthalenes | 71.0 |
| Tetralins and/or indanes | 22.3 |
| Alkyl benzenes | 6.7 |

Carbon number, percent w.:

| | |
|---|---|
| C-10 | 0.7 |
| C-11 | 30.2 |
| C-12 | 49.8 |
| C-13 | 7.0 |
| C-14 | 2.3 |

The initial condensation was carried out as follows: 200 parts by volume of glacial acetic acid were mixed with 15 parts by weight of zinc chloride, and 10 parts by weight of para-formaldehyde. These were heated at the reflux temperature to form a uniform solution after which 43.3 parts by weight of the above hydrocarbon feed and 7.5 parts by weight of phenol were added. The reaction mixture was heated to reflux (115° C.) for ½ hour after which one part by volume of water was added to coagulate the resin and spring it from the acid phase. The resin was dissolved in benzene and water washed to remove traces of acid and catalyst, after which benzene was removed under vacuum to isolate the purified resin. It was found to have a molecular weight of about 600, a ring and ball softening point of 250° F., was very light in color and showed a strong hydroxyl indication at 3600 cm.$^{-1}$ by infrared analysis. This indicated that the resin contained bound phenolic groups rather than being a mixture of unreacted phenol with another resin.

The resin so produced was condensed with bis[4-(3,4-oxy-1-oxabutane)phenyl]dimethyl methane.

Epoxidation was conducted in the presence of a curing agent, namely, the condensation product of meta-phenylene diamine and phenyl glycidyl ether. Four resins were obtained by heating various combinations of these 3 ingredients for 3 hours at 250° F. temperature.

TABLE

| Polyepoxide | Phenolic Resin | Curing Agent |
|---|---|---|
| 18 | 2 | 3.6 |
| 16 | 4 | 3.2 |
| 13 | 7 | 2.6 |
| 10 | 10 | 2.0 |

We claim as our invention:

1. The process for the preparation of a resin which comprises simultaneously reacting an aromatic fraction consisting of mixtures of aromatic hydrocarbons boiling within the limits from about 450° F. to about 715° F., substantially free from olefins and alpha-alkyl naphthalenes, and containing at least about 70% by weight of beta-alkyl naphthalenes with 15–30% by weight each of formaldehyde and a monohydric phenol of the group consisting of phenol and alkylated phenols in the presence of at least one water soluble $C_{1-4}$ fatty acid and zinc chloride under substantially anhydrous conditions at about the reflux temperature of the acid, whereby substantially only light-colored resins are formed, and separating the resins from the reaction mixture.

2. The process for the preparation of a resin which comprises simultaneously reacting an aromatic hydrocarbon fraction consisting of mixtures of aromatic hydrocarbons boiling within the limits from about 460° to about 700° F., substantially free from olefins and alpha-alkyl naphthalenes and containing at least about 70% by weight of beta-alkyl naphthalenes and 5–25% by weight of partially hydrogenated bicyclic hydrocarbons with 5–40% by weight each, based on the hydrocarbon of formaldehyde and a monohydric phenol of the group consisting of phenol and alkylated phenols in the presence of zinc chloride and acetic acid for 0.75–2 hours at reflux under substantially anhydrous conditions, whereby only light-colored resins are formed, said resins containing no dark colored components and having a molecular weight of 450–700, and separating the resins from the reaction mixture.

References Cited by the Examiner

UNITED STATES PATENTS 2,907,725 10/59 Greenlee _____ 260—43
3,092,610 6/63 Schwarzer _____ 260—831

FOREIGN PATENTS 541,771 6/57 Canada.

LEON J. BERCOVITZ, *Primary Examiner.*

DONALD E. CZAJA, *Examiner.*